Feb. 15, 1955
C. W. BROWN
2,701,966
PRESSURE GAUGE
Filed Aug. 7, 1950
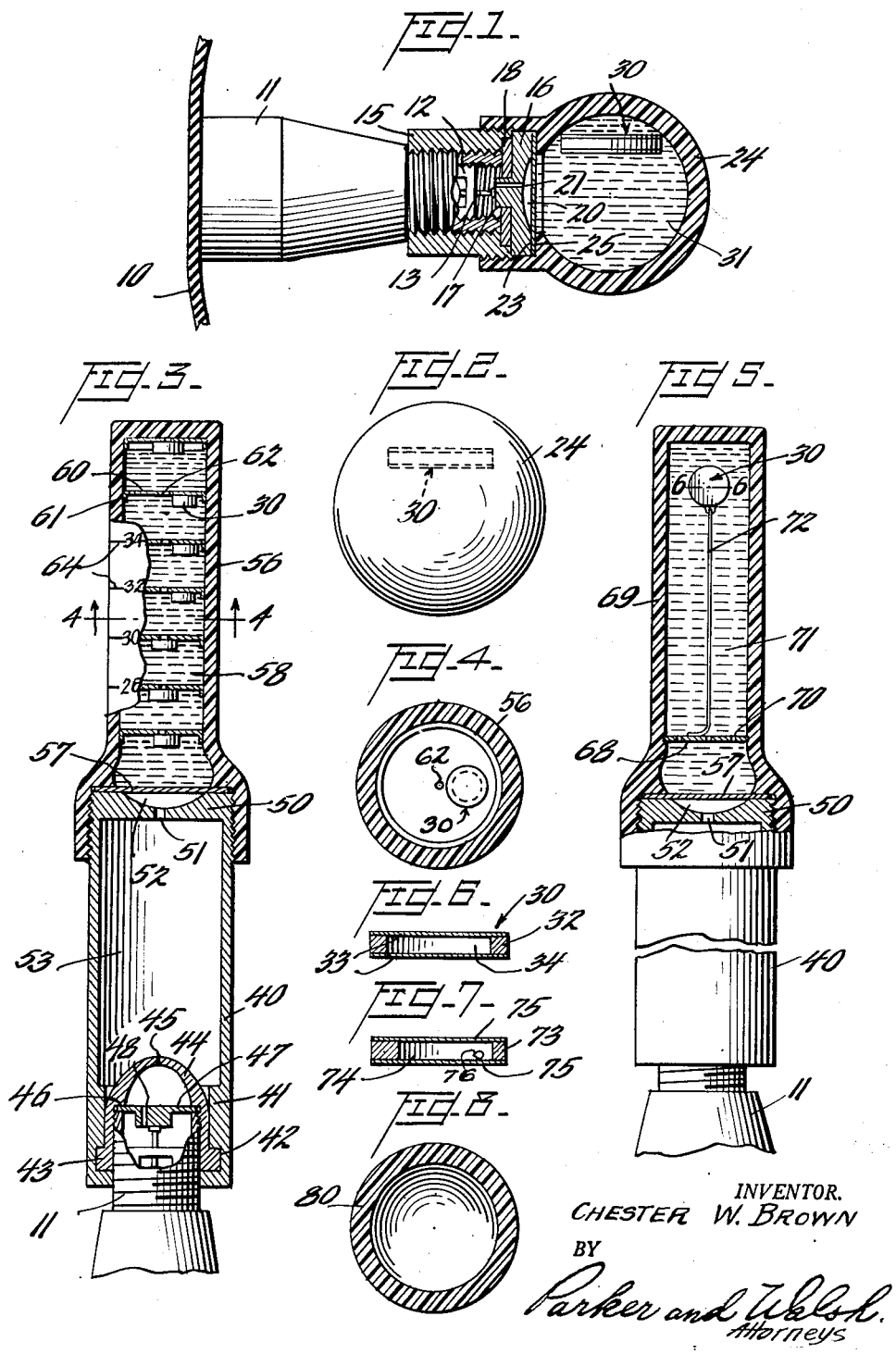
INVENTOR.
CHESTER W. BROWN
BY
Parker and Walsh.
Attorneys

United States Patent Office 2,701,966
Patented Feb. 15, 1955

2,701,966
PRESSURE GAUGE

Chester W. Brown, Folsomville, Ind.

Application August 7, 1950, Serial No. 178,040

12 Claims. (Cl. 73—390)

This invention relates to a pressure gauge for measuring or indicating the pressures of gases or fluids.

An important object of the present invention is to provide a pressure gauge which takes advantage of the general principle of the Cartesian diver, to provide a simplified type of pressure gauge which is readily adapted for indicating fluid pressures from zero to several hundred pounds per square inch.

A further object is to provide such a device wherein a novel type of float is immersed in a body of liquid adapted to be subjected to a static pressure in a given source, and wherein the float is so designed that at a given predetermined pressure its displacement will decrease to the point where the specific gravity of the float is less than that of the body of liquid, whereupon the float will sink.

A further object is to provide such a device wherein the body of the liquid is completely sealed in a rigid container having an element forming a wall thereof flexible and dividing the body of liquid from a fluid space adapted to communicate with the source of pressure to be checked, the liquid and the float therein being permanently sealed and eliminating the use of any wearing parts so that the life of the device is indefinite.

A further object is to provide a pressure gauge of the general type referred to, the various parts of which are of such character that the materials and designs of the parts may be predetermined to compensate for temperature variations so as to give relatively accurate pressure indications substantially regardless of temperature variations.

A further object is to provide a simple type of pressure gauge of the general character referred to which lends itself particularly readily to use as a tire gauge or indicator, one form of which may be substituted for a conventional tire cap to provide a visual indication when the pressure in the tire has dropped below the desired inflation pressure, and other types of which provide graduated pressure indications for use in connection with different tires to indicate pressures therein.

A further object is to provide a pressure gauge which may be manually connected to a source of pressure, for example by attaching the device to the valve stem of a tire, and wherein the device may be removed from its connection with the source and read to determine the tire inflation, the device being provided with means for maintaining the fluid chamber under pressure from the source being tested.

A further object is to provide a pressure gauge of the character just referred to wherein it is unnecessary to reset the device to zero when employing it with different pressure sources.

Other objects and advantages of the present invention will become apparent during the course of the following description.

In the drawing, I have shown several embodiments of the invention. In this showing, Figure 1 is an axial sectional view through one form of the device shown in position on the valve stem of a tire, parts being shown in elevation and a portion of the inner tube of the tire being shown in section, Figure 2 is an end elevation of the same, Figure 3 is a view similar to Figure 1 showing a modified form of the invention, illustrated as being connected to a valve stem, Figure 4 is a detailed section on line 4—4 of Figure 3, Figure 5 is a sectional view of a further modification of the device shown attached to a valve stem, parts being shown in elevation, Figure 6 is a detailed sectional view through one type of float used with the device, Figure 7 is a similar view of a modified type of float, and Figure 8 is a sectional view of a still further modified type of float made in the form of a sphere.

Referring to Figure 1, the numeral 10 designates the inner tube of an automobile tire having the usual valve stem 11 in which is arranged a conventional valve indicated as a whole by the numeral 12 and provided with a valve stem 13. These parts, of course, are of the usual well-known type. The form of the device shown in Figure 1 comprises an internally threaded sleeve 15 threaded on the stem 11. Outwardly of the sleeve is arranged a disc 16 having a central boss 17 projecting through a central opening in a gasket or sealing washer 18. When the device is in the operative position shown in Figure 1, the boss 17 engages the end of the stem 13 to maintain the tire valve open.

The disc 16 is recessed in the face opposite the valve stem to provide a pressure chamber 20 communicating with the interior of the threaded portion of the stem 11 through a passage 21. Against the inner face of the disc 16 is seated a flexible diaphragm 23 closing the pressure chamber 20 from the interior of the bulb or body 24 of the gauge. This body, in the present instance, is shown as being substantially spherical and the body is formed of any suitable transparent material for a purpose to become apparent. The body 24 is provided with a shoulder 25 against which the diaphragm 23 seats, and a tubular extension on the body 24 is suitably secured to the sleeve 15, for example by threading it thereon as shown in Figure 1.

The body 24 contains a float indicated as a whole by the numeral 30 and is otherwise completely filled with a body of a suitable liquid 31. Air is completely excluded from the interior of the body 24 for a purpose which will become obvious below.

The float 30 is shown in detail in Figure 6, and is one type of float adapted to be used with any form of the device as will become apparent. The float comprises a body 32 in the form of an annulus against each side of which is cemented or otherwise secured a diaphragm 33 completely closing and sealing the space 34 within the annulus. The diaphragms 33 are flexible and are subject to distortion in accordance with pressures in the fluid body 31 to increase or reduce the volume of the space 34 and consequently the displacement of the float, thus varying its specific gravity to determine the degree of buoyancy of the float, as further described below.

The device shown in Figure 1 is primarily intended to be mounted on a tire valve stem to replace the regular cap therefor, the device remaining permanently in position to visually indicate when the tire, through leakage, has become deflated below the desired pressure. In Figure 3, I have illustrated a modified form of the invention which is adapted to be used as a calibrated tire gauge, varying pressures being indicated by the float means included therein.

Referring to Figure 3, the numeral 40 indicates a generally cylindrical body having its lower end threaded on the valve stem 11 of the tire in the same manner as the sleeve 15 in Figure 1. At a point spaced from its lower end, the body 40 is provided with an internal annular flange 41 forming therebelow a groove 42 receiving the flange 43 of a nipple 44 formed of rubber or other resilient material, the resiliency of the nipple permitting the flange 43 to be distorted radially inwardly for insertion into position from the lower end of the body 40. The nipple 44 has a dome-shaped top in the center of which is formed a normally closed opening 45. Within the nipple 44 is formed a shoulder 46 against which seats a disc 47 similar to the disc 16 previously described and having a central boss which unseats the valve stem. The disc 47 is provided with an air passage 48.

At its upper extremity, the body 40 is provided with a top wall 50 having a passage 51 therethrough, and the top face of the wall 50 is dished to provide an air chamber 52. This chamber communicates through the passage 51 with the chamber 53 formed within the body 40.

Above the body 40 is arranged the transparent tubular gauge member 56 flared at its lower end for connection in any suitable manner, for example by threading, on the upper end of the body 40, and the gauge member 56 clamps and seals against the top wall 50 a flexible diaphragm 57, subject to pressure in the chamber 52 and operative for transmitting such pressure to a body of a suitable liquid 58 in the gauge body 56.

At spaced points within the body 56 are arranged a plurality of discs 60 which may be flanged at their edges 61 to provide surfaces to frictionally hold the discs 60 in position. It will become apparent that these discs are not subjected to any forces tending to move them, and a tight fit is all that is necessary to support them in position. These discs are apertured as at 62 to afford communication between the spaces defined by the discs so that the liquid body 58 throughout its volume will be subjected at all times to the same pressure. Inasmuch as the pressure in the liquid 58 is static and the only movement of the liquid which takes place under any conditions is due to expension and contraction, under the influence of temperature changes, these discs may be flexible, in which case the openings 62 may be omitted. In each of the chambers defined by the discs is arranged one of the floats 30, or any other type of float suitable for use with the mechanism such as the modified forms of float described below. Each of these floats will be designed to provide properly graduated specific gravities so that each will float or sink in accordance with suitable graduations 64 on the gauge body 56, as will become more apparent below.

Except for the provision of the discs 60 and the plurality of floats 30 as employed in the form of the invention shown in Figure 3, the device shown in Figure 5 may be used to provide graduated readings with a single float, and the device will be reasonably accurate. Most of the parts employed in connection with the modified device in Figure 5 are identical with those shown in Figure 3, and such parts have been referred to by the same reference numerals. Instead of a plurality of discs 60, I employ a single disc 68, fixed in the lower end of a transparent gauge body 69, substantially identical with the gauge body 56 in Figure 3. This disc 68 is perforated as at 70 to afford communication between the interior of the upper part of the gauge body 69 and the lower part thereof above the diaphragm 57, to permit the complete filling of the gauge body with liquid 71. This modification of the invention employs a single float 30, and in order to eliminate a critical pressure in the liquid 71 at which the float will start to rise or fall, the float is provided with means in the form of a flexible element 72 attached to the float and depending therefrom as shown in Figure 5. As the float starts to sink, the flexible element will start to gather on the disc 68, thus tending slowly to reduce the specific gravity of the float and the suspended portion of the element 72, permitting a single float to be used to indicate graduated pressures. The gauge body 69 will be calibrated in the same manner as the gauge body 56.

Various forms of gauge floats may be used in place of the float 30 as shown in Figure 6. Such float is circular and the annulus 32, of course, is of uniform thickness throughout its circumference. In Figure 7, a similar float body 73 is employed except that the space 74 therein, sealed by flexible diaphragms 75, is eccentric. Variations in the specific gravity of such float incident to movement of the diaphragms 75 toward and away from each other will not be uniform throughout the horizontal area of the float, the result being that the float will partake of a tilting action to present one side or the other to view more prominently than the edge of the float. The diaphragms 75 may be colored so as to render them more clearly visible when the float tilts under the conditions referred to. Diaphragms 75 may be of different thicknesses, or, to vary the specific gravity of the incompressible materials thereof, the float may have embodied therein some weighting means, such as finely divided metal embodied in the material, or a solid piece of metal, as indicated by the numeral 76. Floats of the two types described may be disposed normally horizontally as in Figures 1 to 4 inclusive or vertically as in Figure 5.

A further modified form of float is shown in Figure 8 and indicated by the numeral 80. This float may be formed of plastic or any other suitable material of a reasonably deformable nature, the float being in the form of a hollow sphere and being deformed to reduce it in size and displacement upon increases in the static pressure in the body of liquid in which it is employed, as will become more apparent below.

*Operation*

The several forms of the device operate on the same general principle as the well-known Cartesian diver. The form of the device shown in Figure 1 is primarily intended to be used as a permanent attachment, in place of the conventional cap, on the valve stem of an automobile tire to afford a visual indication when the tire has become deflated below its rated pressure. The boss 17 maintains the valve of the tire in open position so that the pressure in the chamber 20 is always exactly the same as the pressure within the tire. The flexible diaphragm 23 communicates this pressure to the body of liquid 31, thus creating in such liquid a static pressure corresponding to that present in the tire. The diaphragms of the float 30, assuming that such float is used, will be flat and parallel to each other at atmospheric pressure. Upon the attaching of the device to the valve stem and the subjecting of the liquid 31 to pressure, the diaphragms of the float will be deflected toward each other, thus reducing the displacement of the float and increasing its specific gravity. The float is designed for the particular type of tire with which it is to be used and the critical pressure of the float will be the desired inflation pressure of the tire. At or above such pressure, the specific gravity of the float will be such that the float will sink to the bottom of the bulb or body 24, thus indicating that the tire is properly inflated. If the tire pressure drops below the critical buoyancy pressure of the float, the diaphragms of the float will spread slightly apart to increase the displacement of the float and reduce its specific gravity relative to the liquid 31, whereupon the float will rise to the top of the bulb as shown in Figure 1.

In the form the of the invention just described, a single float is used to indicate a single pressure, namely that of the particular tire or type of tire with which the device is intended to be used. The form of the device shown in Figures 3 and 4 is intended to be used as a tire gauge to indicate any desired tire inflation pressures, and each individual float 30 is designed for a different critical pressure.

The device is attached to the tire stem by screwing it in position as shown in Figure 3, the boss of the disc 47 opening the tire valve and admitting air through the opening 45 into the space 53 and thence into the chamber 52. This pressure will be communicated to the diaphragm 57 which thereupon establishes in the liquid 58 a static pressure corresponding to the pressure in the tire. Each float 30 is designed to have a different critical pressure. When the pressure in the liquid 58 is above the critical pressure of any float 30 in the body 56, such float will sink. Assuming that the device is calibrated in lower pressure toward the bottom, the lowermost float will be designed for the lowest critical pressure and the critical pressures of the floats thereabove will be progressively higher. Assuming that pressure in the tire is above the critical pressure of the third float from the bottom, as an example, but below the critical pressures of the next four floats, the three lowermost floats will sink while the remaining floats will be in the positions shown in Figure 3. The pressure in the tire will then be a pressure corresponding to the calibration between the third and fourth floats.

It is not necessary to leave the device in position on the valve stem. The device may be threaded on the stem or merely pushed downwardly thereon for a few seconds and then removed and the pressure in the chamber 53 will seal the opening 45, whereupon the device may be held vertically at a convenient height to be easily read. It is not necessary to reset the device, since the next use of the device will open the tire valve and communicate the chamber 53 with the interior of the tire.

Inasmuch as each individual float will be designed to have a particular critical pressure, a single float may be employed with a graduated gauge body only by providing some means for graduating the critical pressure, so to speak, in accordance with the height of the float in the gauge body 69. In Figure 5, this is done by the use of the flexible element or thread 72, as described above.

The hollow ball or sphere 80 in Figure 8 is formed wholly of flexible diaphragm material such as a suitable deformable plastic, and the displacement of this ball will vary according to the pressure to which it is subjected. The specific gravity of the ball thus will be varied as in the case of the other floats to accomplish the same result.

Various types of floats obviously may be used, such as the form shown in Figure 6 with diaphragms of the same thickness, or a float as shown in Figure 7 with diaphragms of different thicknesses and colored with the same or contrasting colors for the easier reading of the device according to the position of the float. In each case, the float is provided with a gas chamber which is variable in volume according to variations in pressure in the body of liquid.

The principal difficulty to overcome in the design of the float is to compensate for changes in the specific gravity of the float and of the liquid in accordance with temperature changes. To accomplish this, a careful selection of materials is necessary for each limited pressure range of the gauge. Assuming that the device is used as a tire gauge and bearing in mind that the tire and the air therein has a great range of temperature variations between sitting in a garage and running on a hot day, the theory for temperature compensation is as outlined below, applying the following symbols:

$T1$ = low temperature (absolute)
$T2$ = high temperature
$P1$ = pressure at $T1$
$P2$ = pressure at $T2$
$S1$ = specific gravity of liquid at $T1$
$S2$ = specific gravity of liquid at $T2$
$V1$ = volume of air in tire at $T1$
$V2$ = volume of air in tire at $T2$
$v$ = volume of liquid displaced by float at $T1$ and zero pressure
$v1$ = volume of liquid displaced by float at $T1$ and $P1$
$v2$ = volume of liquid displaced by float at $T2$ and $P2$
$Ca$ = cofficient of expansion of the air or $1/273$ per °C.
$Cm$ = coefficient of expansion of the float material
$CL$ = coefficient of expansion of the liquid
$vm1$ = volume of float material at $T1$
$vm2$ = volume of float material at $T2$
$va$ = volume of air in float at $T1$ zero pressure
$va1$ = volume of air in float at $T1P1$
$va2$ = volume of air in float at $T2P2$ $T1$, $T2$, $P1$, $P2$, $V1$, $V2$ and $Ca$ are factors set by conditions.

$T2/T1 \times P1$ is greater than $P2$ owing to stretch and expansion of tire when heated. This factor must be considered. If $V1=V2$, then $P1/P2=T1/T2$, but tires stretch, so V2 is greater than V1 and $$P2 = T2/T1 \times V1/V2 \times P1$$

This means that P2 must be determined experimentally for different sizes and designs of tires and a general average taken in using P2 in the design.

S1 can be varied by changing materials used in the solution of the liquid.

S2 will depend on CL.

CL will vary slightly as S1 is varied by changing solution.

$v$ is a matter of design selection.
$v = vm1$ plus $va$
$v1 = vm1$ plus $va1$
$v2 = vm2$ plus $va2$
$va1 \times P1/P2 \times T2/T1 = va2$
$vm1$ plus $vm1Cm\ (T2-T1) = vm2$ For the best design of the float, we want $$v1/v2 = S2/S1 \text{ or } v1S1 = v2S2$$

In other words, the float must be designed so that it has the same floating characteristic at T1 as at T2, therefore giving a correct reading for the proper pressure even through a range of temperature changes. On the other hand, the hand gauge float might be designed to give correct pressure readings in pounds per square inch at all temperatures by making $v1S1=P1/P2v2S2$ or $v2=v1S1/S2 \times P2/P1$. To meet these conditions, the volumes of the air in the float and the other material must be balanced for specific gravity changes through temperature changes.

$$vm1 \text{ plus } vm1Cm(T2-T1)=vm2$$

$Ca$ is greater than $CL$ is greater than $Cm$ from natural laws.

In designing the float for temperature compensation, the three thermal coefficients of volume expansion for the gas within the float, the solid material of the float and the liquid body in which the float operates must be considered. In general, a solid expands to a relatively small extent with a given temperature rise; a liquid expands relatively more than a solid, and a gas expands relatively more than either a solid or liquid. Bearing in mind that the float is ready to sink at its critical pressure, as the temperature rises, the liquid expands, making the liquid less able to support the float. However, the solid material of the float expands as the temperature rises, to a lesser extent, however, than the liquid, and if a solid material were used which approached the specific gravity of the liquid, the float would tend more and more to sink as the temperature rises. On the other hand, as the temperature of the air or other gas in the float rises, the air expands to a greater extent than the liquid, tending to render the float more buoyant. As the temperature of the tire increases, the pressure rises, tending to sink the float. By selecting a liquid and a solid material for the float with suitable specific gravities, it can be seen that the amounts of air and solid material in the float can be varied to give almost any temperature control effect, for either a true pressure reading in a hand gauge or a constant temperature-pressure relation for a tire indicator as in Figures 1 and 2.

Expressed in a somewhat different way, the float is made up of a relatively incompressible body, namely, the sphere or the annulus and diaphragms depending on which type of float is used, and the body of compressible air or other gas within the float. The sum of the weights of such compressible and incompressible parts of the float divided by the volume of the float as a whole must be less than the density of the liquid. These are the initial requirements for a float to have a critical pressure point between the minimum and maximum pressures to be gauged. The proportions of the compressible and incompressible materials, as well as their specific gravities, and the specific gravity of the liquid determine the critical pressure point.

Assuming that the pressure is at the critical point for a given temperature, the float will neither rise nor fall. As the temperature of the liquid body is then raised, the incompressible part of the float will expand slightly, the compressible part will expand to a substantially greater extent, and the liquid will expand to an extent somewhere between the extent of expansion of the two float materials. As the liquid expands, it becomes lighter, tending to allow the float to sink. As the float materials expand, the float tends to become lighter and relatively more buoyant. The extent of expansion of the float as a whole depends upon the proportions by volume of the compressible and incompressible parts. The greater the relative volume of the incompressible material, the less the float will expand, and vice versa. When the natures of the liquid body and the compressible and incompressible materials of the float and the relative specific gravities of these materials are correct, the float will have a relatively uniform critical pressure throughout a substantial range of temperatures.

The hand gauge may be designed with a variable float as in Figure 5 or a number of floats as in Figure 3, and in the latter case, floats of various colors may be used. The variable float employed with the form of the invention in Figure 5 cannot be readily fully temperature compensated, but it can be compensated with sufficient accuracy for use as a tire pressure gauge and will possess a greater degree of accuracy than the spring type gauges now used. For other uses where more accurate indications are desired, a number of series of calibrations may be provided for different temperature ranges.

I claim:

1. A pressure gauge comprising a hollow gauge body formed of transparent material and having an opening, a flexible diaphragm closing said opening, said body and said diaphragm defining a fluid chamber filled with a body of a liquid, a float in said fluid chamber, said float comprising a hollow sphere formed of deformable material whereby said float is reduced in volume and increased as to its specific gravity relative to said body of liquid when the pressure therein increases, and a pressure chamber connected to said gauge body and adapted for connection with a source of pressure, said diaphragm dividing said pressure chamber from said fluid chamber whereby pressure in said pressure chamber will be duplicated in said fluid chamber, said float having a critical pressure point relative to said body of liquid above which point the specific gravity of said float is greater than said body of liquid so that said float will sink, and below which point said float is buoyant.

2. A pressure gauge comprising a cylindrical transparent gauge body normally arranged vertically, a sleeve member connected to the lower end of said gauge body, a flexible diaphragm at the lower end of said gauge body and dividing the interior of such body from the interior of said sleeve, the interior of said gauge body comprising a fluid chamber filled with liquid and the interior of said sleeve forming a pressure chamber, said sleeve being connectible to a source of pressure, said diaphragm acting under pressure in said pressure chamber to generate a corresponding pressure in said fluid chamber, and a float in said fluid chamber of such nature as to be reducible in size as pressure increases in said fluid chamber, thus increasing the specific gravity of said float relative to said body of fluid, said float having a critical pressure point relative to said body of liquid above which point the reduction in size of said float raises the specific gravity of said float above that of said body of liquid so that the float sinks, the specific gravity of said float above such point being less than that of body of said liquid whereby said float is buoyant.

3. A pressure gauge comprising a cylindrical transparent gauge body normally arranged vertically, a sleeve member connected to the lower end of said gauge body, a flexible diaphragm at the lower end of said gauge body and dividing the interior of such body from the interior of said sleeve, the interior of said gauge body comprising a fluid chamber filled with liquid and the interior of said sleeve forming a pressure chamber, said sleeve being connectible to a source of pressure, said diaphragm acting under pressure in said pressure chamber to generate a corresponding pressure in said fluid chamber, and a float arranged in said fluid chamber, said float being hollow and having at least a portion thereof formed of flexible material whereby the float as a whole is deformable under increases in pressure in said fluid chamber to reduce its volume and increase its specific gravity relative to said body of liquid, said float having a critical pressure point relative to said body of liquid above which point the specific gravity of said float is greater than of said liquid body so that the float sinks and above which point said float is buoyant.

4. A device constructed in accordance with claim 3 wherein said float comprises a solid ring having closure members fixed to opposite sides thereof to seal the space within said ring, one of said closures being a flexible diaphragm and forming said flexible portion of said float.

5. A device constructed in accordance with claim 3 wherein said float is a hollow sphere formed of deformable material.

6. A device constructed in accordance with claim 3 wherein said gauge body is provided above said diaphragm with a perforate wall, and a flexible element connected at one end to said float and depending in said fluid chamber, said flexible element being contactible with said wall to gather thereon as the float sinks to alter the specific gravity characteristics of said float as the latter moves upwardly and downwardly.

7. A pressure gauge comprising a cylindrical transparent gauge body normally arranged vertically, a sleeve member connected to the lower end of said gauge body, a flexible diaphragm at the lower end of said gauge body and dividing the interior of such body from the interior of said sleeve, the interior of said gauge body comprising a fluid chamber filled with liquid and the interior of said sleeve forming a pressure chamber, said sleeve being connectible to a source of pressure, said diaphragm acting under pressure in said pressure chamber to generate a corresponding pressure in said fluid chamber, a plurality of discs in said gauge body dividing it into chambers and of such nature as to communicate pressure uniformly throughout said liquid body, and a deformable float in each chamber, each float being deformable to be reduced in volume under the influence of increasing pressures in said body of liquid to increase its specific gravity and each having a critical pressure point above which its specific gravity is greater than that of said liquid so that it will sink and above which it is buoyant, the critical pressure points of said floats progressively differing from one end of said fluid chamber to the other.

8. A pressure gauge comprising a transparent gauge body, a hollow member connected to said body, a flexible diaphragm between said gauge body and said hollow body, said gauge body comprising a fluid chamber filled with liquid and said hollow body forming a pressure chamber the pressures in which are communicated to said fluid chamber by said diaphragm, said hollow body having a connection adapted for operative attachment to a hollow element connected with a source of pressure, a flexible device in said hollow body between said connection and said pressure chamber, said flexible device having an opening therethrough to admit fluid under pressure from said source into said pressure chamber and to close under the influence of pressure in said pressure chamber when said connection is removed from said source to retain pressure in said pressure chamber, and a float in said gauge body, said float being deformable under pressure in said fluid chamber to reduce its volume and increase its specific gravity, said float having a critical pressure point above which the specific gravity of said float is greater than that of said body of liquid so that the float will sink and below which point the specific gravity of said float is less than that of said body of liquid so that the float will be buoyant.

9. A pressure gauge comprising a hollow gauge body formed of transparent material and having an opening, a flexible diaphragm closing said opening, said body and said diaphragm defining a fluid chamber, a body of a liquid completely filling said fluid chamber, a hollow float in said fluid chamber comprising a closed body of a relatively incompressible material and an occluded body of gas, said float having at least one flexible wall portion whereby it is deformable to vary its volume, a member fixed to said gauge body and connectible to a source of fluid pressure, said member and said diaphragm forming a pressure chamber, increases in pressure in which will be communicated through said diaphragm to generate a corresponding pressure in said liquid body, the proportions by volume of the incompressible material of said float body and said occluded body of gas, and the nature of said liquid body, said incompressible material and said occluded body of gas, including the relative specific gravities thereof, being such that the specific gravity of the float as a whole bears a fixed relationship to the specific gravity of the liquid body at substantially varying temperatures of said liquid body and said float.

10. A device of the type set forth in claim 9 wherein said float comprises an annulus and a pair of flexible diaphragms secured against opposite sides thereof to seal the space therein, said diaphragms being deformable under pressure to vary the volume of the float.

11. A device of the type set forth in claim 10 wherein said annulus has an eccentric space therein so that one side of said annulus is thicker than the other whereby changes in the specific gravity of said float will cause it to assume different angular positions in said body of liquid.

12. A device of the type set forth in claim 9 wherein said float includes a weighting material.

References Cited in the file of this patent

UNITED STATES PATENTS

| | | |
|---|---|---|
| 1,490,036 | Sheppard | Apr. 8, 1924 |
| 1,590,141 | Weaver | June 22, 1926 |
| 1,646,968 | Louder | Oct. 25, 1927 |
| 1,779,066 | Halsey | Oct. 21, 1930 |

FOREIGN PATENTS

| | | |
|---|---|---|
| 16,054 | Great Britain | Dec. 6, 1884 |
| 358,462 | Germany | Sept. 9, 1932 |